Patented Nov. 21, 1939

2,180,382

UNITED STATES PATENT OFFICE 2,180,382

PROCESS OF PREPARING CALCIUM CYANAMIDE

Ernst Winter, Cologne-Braunsfeld, and Herbert Polack, Knapsack, near Cologne-on-the-Rhine, Germany, assignors to Aktiengesellschaft für Stickstoffdünger, Knapsack, near Cologne-on-the-Rhine, Germany No Drawing. Application October 1, 1937, Serial No. 166,714. In Germany October 2, 1936

1 Claim. (Cl. 23—78)

The present invention relates to a process of preparing calcium cyanamide in a revolving furnace at various degrees of dilution.

The action of the dilution upon the course of the reaction during the preparation of calcium cyanamide is known and has been described for instance in our copending United States application Serial No. 107,906 filed October 27, 1936.

In all known processes the calcium carbide to be combined with nitrogen is mixed with an inert extender, preferably with calcium cyanamide, and this mixture is introduced into the reaction furnace, or if the calcium carbide and the diluent are separately introduced into the furnace the two components are mixed directly at the inlet. The diluent is mostly added to the carbide in the cold state. By cold state is meant that the diluent is cold relative to the temperature maintained in the furnace.

It is intended by the dilution to cause a mechanical separation of the carbide particles from each other in order to prevent agglomeration of the particles at high and highest temperatures and to attain permanently a sufficient cooling of the calcium carbide at these temperatures. By the absorption of heat the diluent added has to prevent an exceeding of the highest limit of temperature. This cooling by the diluent at that part of highest temperature, however, is only small. For, as the diluent has always the same temperature as the reacting calcium carbide, it can absorb heat only in a quantity corresponding to its further heating. At the peak of a vigorous reaction only a small rise of temperature of some degrees may already cause the mass to sinter. In the case of this small range of temperature, however, the diluent is only capable of absorbing a small quantity of heat while the reaction or the quantity of heat set free increases very rapidly at high temperatures. The cooling caused by the diluent, therefore, is relatively the smallest where the increase of the evolution of heat is the greatest.

At the mouth of the furnace, however, the reaction occurs in a quite different manner. Even when using hot diluents the temperature at the mouth is always essentially lower than the highest temperature in the centre of the furnace in accordance with the quantity of calcium carbide added. The dilute carbide, therefore, has to run through a zone of temperature of several hundred degrees until it reaches the complete reaction speed and besides has to heat the diluent, too. The calcium carbide and the diluent consume heat until the reaction heat of the carbide rising with the temperature is sufficient to elevate the temperature of the mixture to a degree sufficient to promote the absorption of nitrogen. It is evident that a pure calcium carbide reacts more readily than a dilute carbide. The diluent therefore retards the beginning of the reaction.

In practice, however, it is desirable to maintain the working of the furnace without employing complicated variable heating or cooling devices at the outside of the furnace, especially without introducing foreign heat, and merely leading the reaction by varying the procedures occurring in the interior of the furnace. This problem is solved by the process according to the above named copending application, but only for calcium carbide of a certain granular size. On trying to use this process for the working up of larger quantities of calcium carbide dust the difficulties above referred to were observed.

Now we have found that the reaction conditions are quite different when the extender is added to the calcium carbide at that part of the reaction zone in which already an excess of heat is produced. According to this process the calcium carbide which may contain the usual catalysts enters the furnace in the non-dilute state and is heated from the reaction zone by means of radiating heat. Only when the reaction produces an excess of heat and the temperature tends to rise rapidly is the extender added. The temperature and the quantity of diluent may be determined as desired so that the degree of dilution and the withdrawing of heat correspond to the reaction speed.

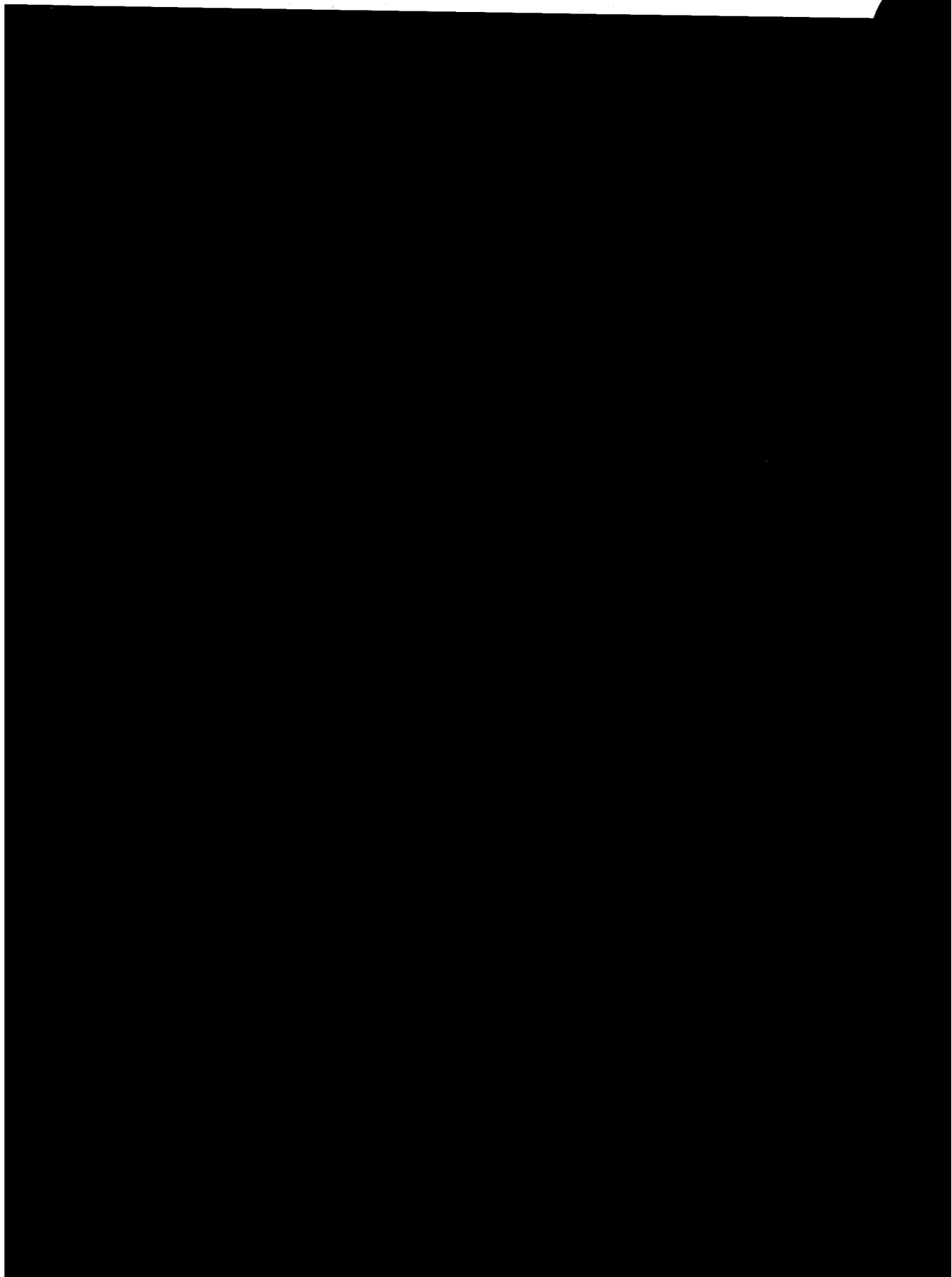

The extender may be added from the inlet or from the outlet side, preferably from both sides simultaneously. The extender may best be introduced into the reaction zone by conveying it together with the nitrogen used according to the normal pneumatic conveying methods. The range of the diluent is determined by the pressure of the nitrogen and by the direction of the end of the conveyor conduit projecting into the furnace. If a calcium carbide is used for the absorption of nitrogen which also contains coarse constituents it is advisable to guide the final product over a dressing machine and to perform the dilution in the furnace chiefly with the fine constituents, because, owing to its larger surface, the fine material has a greater diluting action than the coarse material. According to this method of dilution the main reaction zone which otherwise is inclined to form a so-called peak of the temperature curve is prolonged and thereby the main reaction is distributed over a large space. Thus